US006722267B2

(12) United States Patent
Ciprietti et al.

(10) Patent No.: US 6,722,267 B2
(45) Date of Patent: Apr. 20, 2004

(54) DEVICE FOR AUTOMATICALLY DISPENSING FOOD PRODUCTS, SUCH AS FOOD PRODUCTS TO BE CUT INTO SLICES

(75) Inventors: Filippo Ciprietti, Rome (IT); Donato Carriero, Rome (IT)

(73) Assignee: Tenimenti Angelini S.p.A. Divisione Gli Specialisti, Siena (IT)

( * ) Notice: Subject to any disclaimer, the term of this patent is extended or adjusted under 35 U.S.C. 154(b) by 374 days.

(21) Appl. No.: 09/918,492

(22) Filed: Aug. 1, 2001

(65) Prior Publication Data

US 2003/0056663 A1 Mar. 27, 2003

(30) Foreign Application Priority Data

Oct. 6, 2000 (IT) .................................... TO2000A0929

(51) Int. Cl.[7] .................................................. A23L 1/00

(52) U.S. Cl. ............................ 99/468; 99/537; 99/589; 62/3.2; 62/137; 83/23; 83/932

(58) Field of Search .................. 99/467–470, 474–476, 99/485, 489, 537, 538, 588, 589; 62/137, 320, 354, 3.2, 3.6, 331, 249; 221/96, 150 R; 222/146.6; 53/389.3, 389.4, 514; 426/513, 518; 83/718, 707, 721, 730, 170, 171, 23, 29, 155.1, 86, 90, 932, 176, 441, 648, 409.2, 703

(56) References Cited

U.S. PATENT DOCUMENTS 3,894,457 A * 7/1975 Miller et al. .................. 83/27
4,276,750 A 7/1981 Kawasumi .................. 62/137
4,334,451 A * 6/1982 Bettcher ...................... 83/703
4,356,205 A * 10/1982 Richards ..................... 426/518
4,428,263 A * 1/1984 Lindee et al. ................. 83/354
4,463,643 A * 8/1984 Bettcher ...................... 83/703
4,960,025 A * 10/1990 Fitch .......................... 83/703
5,410,954 A * 5/1995 Wygal et al. ................. 99/537
5,423,250 A * 6/1995 Anderson et al. ............. 99/537
5,640,897 A * 6/1997 Fehr ......................... 99/450.1
5,765,472 A * 6/1998 Kim ........................... 99/537
6,173,575 B1 * 1/2001 Hall et al. .................... 62/3.2
6,318,224 B1 * 11/2001 Hoyland ........................ 83/23
6,390,799 B1 * 5/2002 Volkl .......................... 425/308

* cited by examiner

*Primary Examiner*—Timothy F. Simone
(74) *Attorney, Agent, or Firm*—Roylance, Abrams, Berdo & Goodman, L.L.P.

(57) ABSTRACT

The device comprises a cabinet with atmosphere controlled by refrigeration and/or supply of an inert gas to prevent the deterioration of the foodstuffs. Present in the cabinet is an automatic storage unit with container means for containing the products. The latter are to be fed towards an automatic slicing machine which carries out controlled slicing both as regards the thickness of the slices and as regards the number of slices and the weight of the sliced product. Finally, a delivery unit makes it possible to dispense the products outside the cabinet. Operation of the device is controlled by a unit, which is accessible to the user from outside the cabinet. Said unit is preferably arranged for payment using different paying means.

26 Claims, 4 Drawing Sheets

DEVICE FOR AUTOMATICALLY DISPENSING FOOD PRODUCTS, SUCH AS FOOD PRODUCTS TO BE CUT INTO SLICES

The present invention relates to automatic dispensers of foodstuff products.

Various types of devices for automatically dispensing foodstuff products are already known in the art.

These are, in the majority of cases, vending machines designed to be installed in catering areas (railway or bus stations, airports, etc.) or, in general, in communities or similar environments.

With a certain degree of schematization, but without substantially departing from the actual situation, the foodstuffs that are suited for being dispensed by such known devices may be classified in two fundamental categories, namely:

- packaged foodstuff products (whether these are bottled or canned beverages, ice-creams or even different products, such as potato crisps or pop-corn, in any case already packaged in boxes or bags), and
- products prepared on the spot and hence not pre-packaged but anyway identifiable as "flowable" products, i.e., capable of flowing, whether because they are in the form of liquids (for example, the normal vending machines for coffee, tea and other hot drinks), or because they are in any case available in the form of particulate material that is able in some way to flow and hence to be dispensed (for example, the automatic vendors for hot pop-corn, prepared in the vending machine itself).

For all the products referred to above, the problem of conservation does not arise, except to a limited extent. Bottled or canned beverages or products already packaged in boxes or bags present a certain degree of preservability in time, even for quite long periods and/or in not particularly favourable environmental conditions.

The problem of preservability does not arise, instead (other than at the level of the starting material) for those other foodstuffs (coffee, tea, hot beverages, etc.) that are prepared as required on the spot, immediately before being dispensed by the vending machine.

The purpose of the present invention is to provide a device that is able to extend the sector of possible application of the techniques of automatic dispensing to other foodstuffs, such as sliceable products.

According to the present invention, the above purpose is achieved thanks to a device having the characteristics specifically called for in the ensuing claims.

It will be appreciated that, although the solution according to the invention has been developed with particular attention paid to the possible application to foodstuffs such as seasoned meat, it can in any case find application also with other sliceable foodstuffs of different kinds, such as cheese, bread, vegetables, etc., also in combination with one another.

This makes it possible, if required, to configure the dispensing device according to the invention as an automatic vending machine for dispensing sandwiches or rolls prepared on the spot.

In the currently preferred embodiment, the solution according to the invention is configured as an automatic dispensing machine that can be located, for example, in supermarkets and hypermarkets so as to be able to represent an alternative to the department selling fresh foodstuffs (usually referred to as "delicatessen" or "delicatessen counter"), normally present in such points of sale.

The aim of the foregoing is to enable, for example, the consumer to purchase the product, when is in a hurry, without having to queue and without having to accept compromises as regards the quantity (and, at least in some cases, also the quality) linked to the possible purchase of pre-packaged sliced products.

In particular, with the device according to the invention the consumer is able to select, by means of a special keypad, the product he wishes among the ones available in the dispensing device, as well as the corresponding amount in terms of weight or number of slices.

The device sees to preparing on the spot what the customer requests and to delivering it already packaged and labelled.

In the currently preferred embodiment of the invention, devised with particular attention paid to the possible application to seasoned-meat products, three specific arrangements are made available, according to the type of foodstuffs to be treated:

- sausages and salami;
- mortadella and the like; and
- cooked and raw ham in "bricks".

In the currently preferred embodiment, the device according to the invention comprises a cabinet with controlled atmosphere (in terms of temperature and/or in terms of the presence, for example, of an inert gas) to prevent deterioration (for example, oxidation) of the products in order to ensure their preservation. In this cabinet a product store is present which is made up of a series of compartments, one for each product, capable of containing cylindrical or parallelogram-shaped products of dimensions between a pre-defined minimum value and a pre-defined maximum value. The compartments are arranged preferably so as to be visible from the outside of the device through a transparent window, in particular, as regards the face of the product that is to be sliced.

An automatic system for picking up the selected product from the compartment of the storage unit enables the product to be positioned on the feed carriage of a slicing machine, also enabling the subsequent replacement of the product in the compartment of the storage unit after it has been sliced. The slicing machine is preferably configured as a programmable automatic slicer having a motor-driven feed carriage and delivery belt for dispensing the sliced product. Preferably associated to the slicing machine is a unit for discharging and containing scraps.

There is further provided a unit for feeding and positioning cardboard trays onto the delivery belt of the slicer in an area where the sliced product drops. Associated to this delivery belt is an electronic weighing machine, as well as a unit for packaging the tray containing the sliced product by wrapping it up in a plastic film with heat-sealing of the edges.

Moreover preferably provided is a thermal printer for labels, together with a labeller for application of the labels (containing indications of weight, price and/or the specific characteristics of the product), as well as a chute for delivery of the product outside the machine.

Operation of the device is controlled by means of a keypad, which enables the product to be selected and the desired amount in terms of weight or number of slices to be programmed.

The invention will now be described, purely by way of non-limiting example, with reference to the attached drawings, in which.

Figure 1:
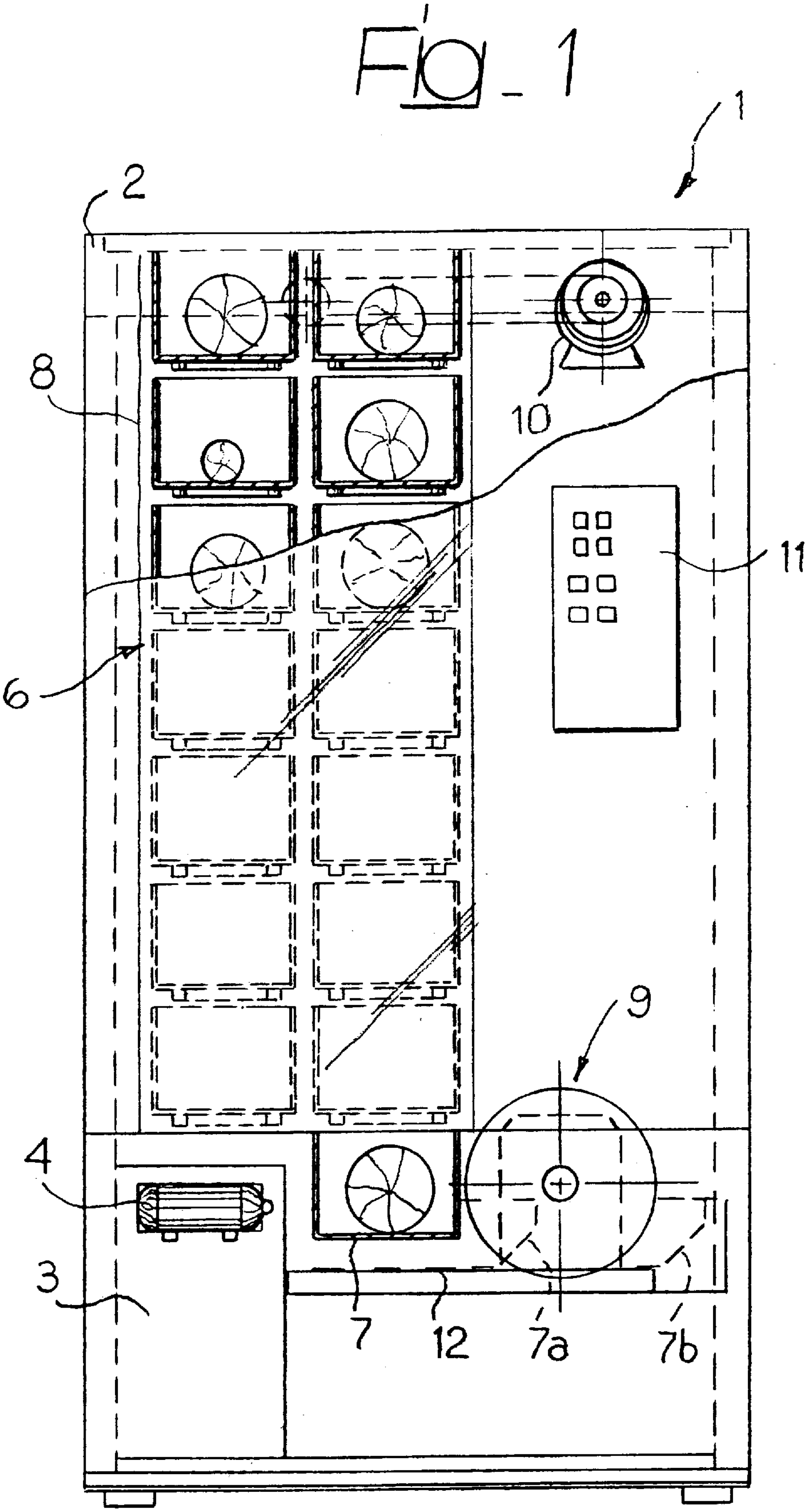
FIG. 1 is a front view partially cut-away and sectioned of a device according to the invention.

In the figures of the annexed drawings, the reference number 1 designates, as a whole, an automatic dispensing device for sliceable foodstuffs, such as seasoned meat.

As has already been said previously, the device according to the invention is, however, usable for sliceable foodstuffs of a different type, such as cheese or bread, for instance.

The device 1 basically comprises a refrigerating cabinet 2 having dimensions and structure substantially resembling those of the refrigerating cabinets already commonly used for automatic dispensing of products, such as canned beverages.

The reference number 3 designates, in the attached drawings, the refrigeration unit associated to the cabinet 2 (the said unit preferably being located in the bottom area of the cabinet 2) in order to enable preservation in a controlled atmosphere.

By the term "controlled atmosphere" is herein meant in general a situation of insulation from the external environment, such as to prevent deterioration (oxidation) of the products that are present in the device 1.

In this connection it is therefore possible to resort to solutions known, for example, from automatic vendors already currently in use for on-the-spot preparation of beverages, such as coffee, tea, etc.

In the currently preferred embodiment of the invention, it is envisaged that the internal space of the cabinet 2 in which the products are present also contains a certain amount of inert gas produced by a generator (for instance, in the form of a small rechargeable gas cylinder), schematically represented and designated by 4, which is preferably located in the vicinity of the refrigeration unit 3.

The fact of having a controlled atmosphere (in terms of temperature and/or composition) inside the cabinet 2 means that the chute for delivering the products, which is located in a position corresponding to the front wall of the cabinet 2 and designated as a whole by 5 (see FIG. 2), is preferably configured in the form of a sort of compensation drawer, such as to maintain the thermal insulation of the internal space of the cabinet 2 and/or prevent, on the one hand, entrance of air into the device 1 and, on the other hand, exit of inert gas from the dispensing device itself.

The reference number 6 designates as a whole an automatic storage unit designed to receive the products within it. The store 6 in question is made up of a plurality of drawer-like containers 7. The containers 7 are usually made of a material, such as steel, which can be kept, with relative ease, in hygienic conditions, the said material being designed to come into contact with the products.

Preferably, the compartments or drawers 7 are made in such a way as to have an open end (namely, the one designated by 7*a* in FIG. 2) so as to enable viewing of the respective products contained therein from outside the cabinet 2 through a transparent window, designated by 8, provided on the front wall of the cabinet.

Figure 4:
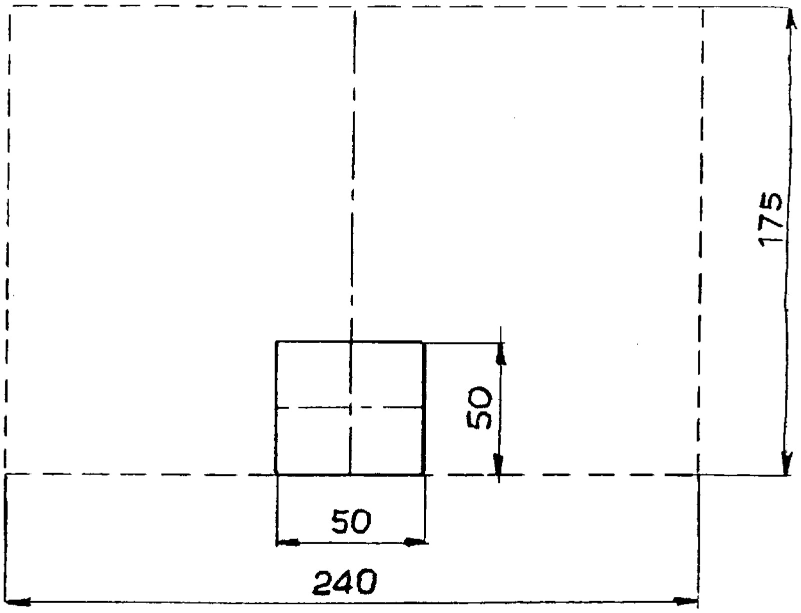
FIGS. 4 and 5 illustrate, by way of example, the typical dimensions of the sliced products that may be dispensed using the device according to the invention.
Figure 5:
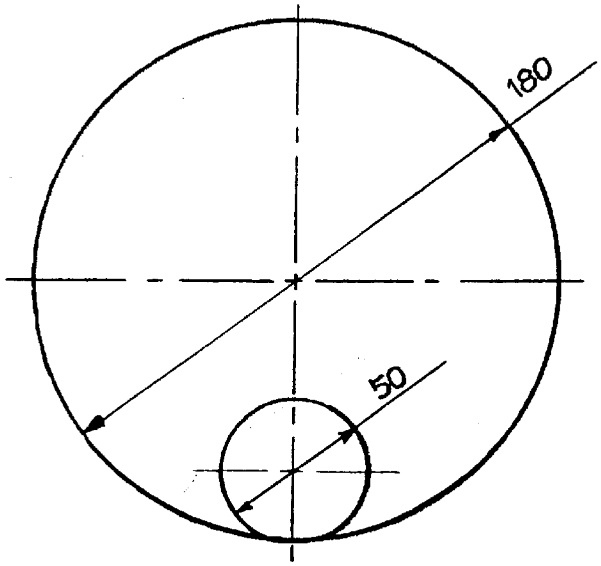

As regards the dimensions of the containers or drawers 7, useful reference may be made to FIGS. 4 and 5, which illustrate the typical cross-sectional values (dimensioned in millimeters) of products that can be treated in a device according to the invention.

For example, FIG. 4 refers to products with a cross section having the shape of a parallelogram, square or rectangle, with dimensions of the base typically between 50 and 240 mm and heights typically of between 50 and 175 mm.

The above values may correspond, for example, to sliceable products, such as cheese, bread, or cooked or raw ham (or other seasoned meat), which, in view of their being dispensed by the device according to the invention are preferably shaped in the course of their fabrication process in such a way as to present a parallelogram section and exactly determined dimensions. It is in fact evident that, in the case of foodstuffs such as ham, the shape and size of the individual product—in the conditions in which it normally appears—are not at all constant, and, what is more, tend to vary, even within a wide range, as the product is sliced.

If, instead, the product is configured as a "brick", it is possible to ensure that it will present and conserve a practically constant and determined cross section as it is sliced.

The above problem, instead, does not arise in general in the case of products such as mortadella or salami (the products to which FIG. 5 refers), which, except for the end parts (i.e., head and tail), which are usually in any case to be rejected, normally present a section that is, if not exactly, at least substantially circular, with moreover dimensions that can be determined in quite a precise way when the product itself is made.

It is, moreover, evident that inside the drawers 7 retention elements are provided (not expressly illustrated in so far as they are of a known type), which enable each product to be kept in a fixed position with respect to the drawer containing it.

The store 6 is configured in such a way as to enable each container 7, and the product contained therein, to be brought selectively up to a slicer 9.

Figure 2:
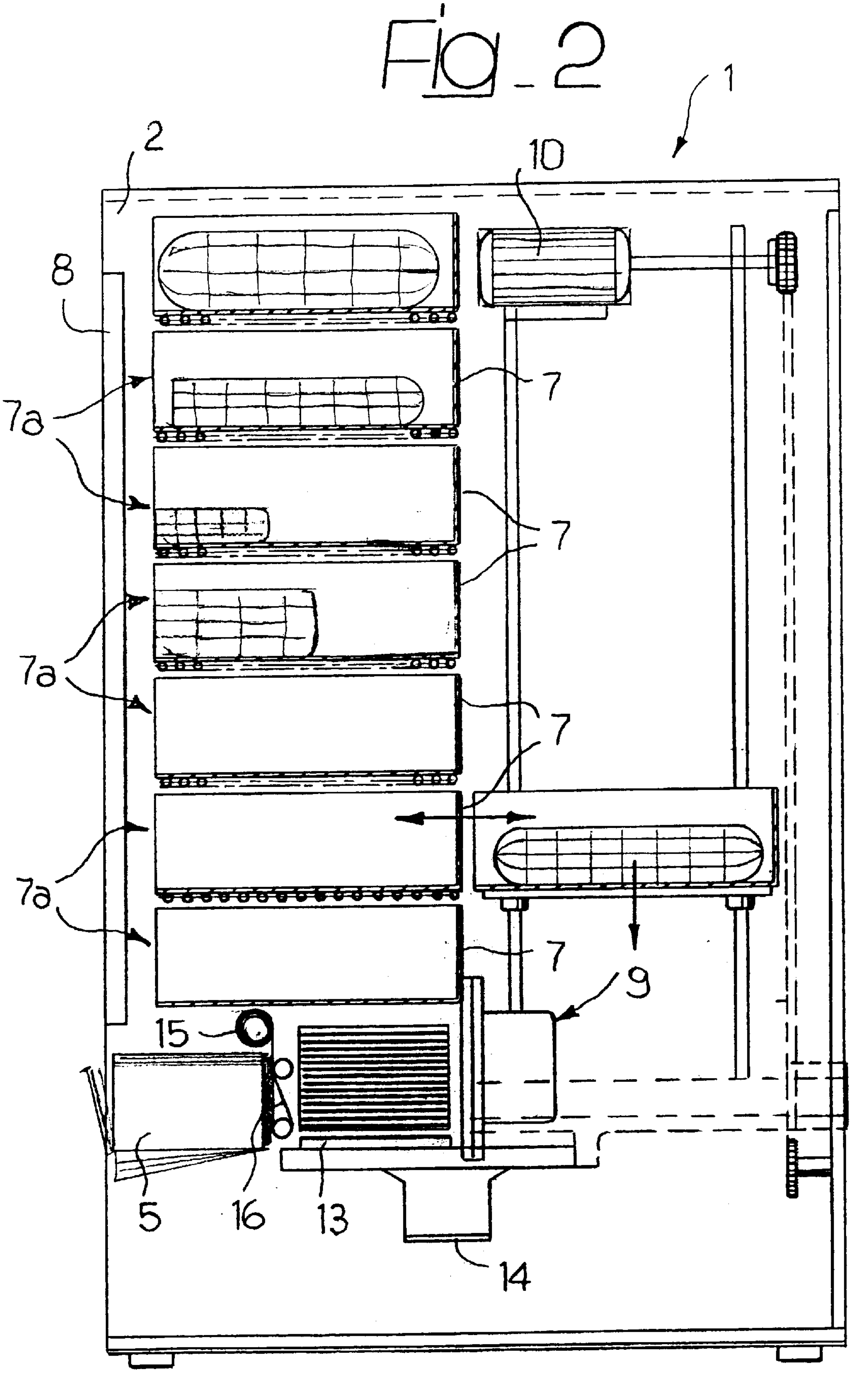
FIG. 2 is a side elevation, which is also partially cut-away and sectioned, of the device represented in FIG. 1 viewed from an angle rotated through 90° with respect to the viewing point of FIG. 1.

For this purpose, the containers or drawers 7 making up the store 6 carry, associated to them, a motor-driven system (for example a chain system) driven by a motor, such as the one designated by 10 in FIGS. 1 and 2.

Figure 3:
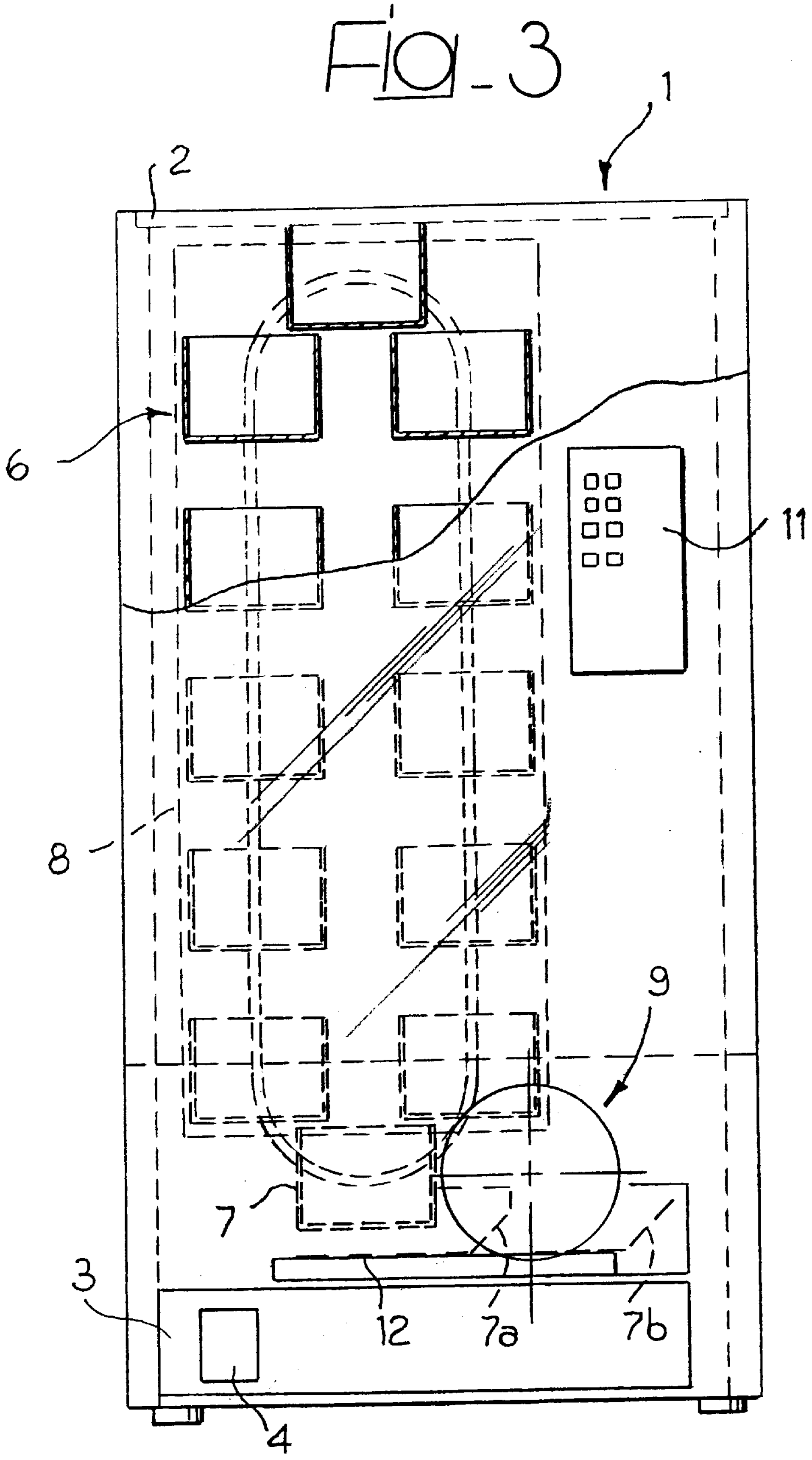
FIG. 3 illustrates, according to modalities that are substantially identical to those of FIG. 1, a possible variant embodiment of the invention.

Selective operation of the motor 10 makes it possible to move the drawers 7. These are normally organized according to a mechanical-arm configuration with orthogonal axes (the solution illustrated in FIGS. 1 and 2) or axes comprised in a carousel conveyor of the type commonly referred to as "paternoster", as in the case of the variant represented in FIG. 3.

Movement systems of the type described above are widely used in the area of automatic stores or magazines in the industrial sector, also in the case of structures of contained overall dimensions, for instance in the case of automatic magazines used for storing and moving dye products in the so-called "colour kitchens" of textile plants. The corresponding solutions are amply known in the art and hence do not require any further detailed description herein.

Basically, the function of the motor 10 is that of moving the individual drawers 7 inside the store 6 in such a way as to bring the container 7 in which the product to be sliced at a given moment is present up to the slicer 9. The said product is chosen by the user by making his selection on the keypad control unit 11 located in a conveniently accessible position on the front of the cabinet 2, usually in a position immediately adjacent to the window 8 through which the user can view the products present inside the cabinet 2.

The slicer 9 is configured in a preferred way as an automatic slicer that is selectively programmable as regards parameters such as thickness of slice (for example, thin, medium or thick slices) and number of slices desired, this latter parameter being selectable either as an absolute parameter (i.e., when the user indicates, by making a selection on the control unit 11, his desire to purchase a given number of slices) or as a relative parameter determined as a function of the weight (i.e., when the user has indicated the amount of product desired on the keypad 11 in expressed as a weight).

In the latter case, associated to the slicer and located in a position corresponding to the belt for collecting the products, in an area where the sliced product drops, is a weighing machine 13, preferably made in the form of an electronic weighing machine.

Also in the case of the slicing machine 9 and of the elements associated to it, the technical solutions are to be deemed amply known, for example in so far as they are commonly adopted in making automatic slicers used in delicatessens for slicing seasoned meat and similar foodstuffs that are to be pre-packaged.

In principle, to enable relative movement between the slicer 9 and the product that is to be sliced it is possible to resort to at least two different solutions.

One solution envisages that it is the slicer 9, and in particular the blade of the slicer (usually a rotary blade), that moves with respect to the container 7 of the product being sliced, which is kept in a fixed position.

The alternative solution, which is the one adopted in the currently preferred embodiment of the invention, envisages, instead, that the slicer 9 and the elements associated to it, such as the weighing machine 13, etc., remain in a fixed position, whilst the drawer 7 in which the product that is currently undergoing slicing is present moves under the action of a corresponding power-driven member (not explicitly visible in the drawings).

For this purpose, the aforesaid drawer (see FIGS. 1 and 3 in which the drawer 7 is situated in the lowest position) is mounted on a mobile slide, which is schematically represented—respectively by a dashed line and by a dashed-and-dotted line—in two positions 7*a* and 7*b* corresponding to the two end positions of the slicing stroke, the extent of which is evidently adjusted according to the size of the product that is being sliced.

Preferably, underneath the area in which the slicer 9 is located, a drop-tray 14 for collecting fragments, scraps, and possible remains is present. The drop-tray 14 is made in such a way as to be readily accessible from outside, since it is made, for example, in the form of a drawer that can be pulled out of the body of the cabinet 2, the purpose being to enable fast removal of any scraps (e.g., the end parts, such as the head and tail of a salami or the like, and/or the first slice—which is to be discarded—after a long period of inactivity or lack of request for a specific product, etc.) in order to ensure constant cleanliness and hygiene of the device 1.

Associated to the belt 12 onto which the sliced products drop is a device for feeding plastic or cardboard trays which will collect the sliced products.

Upstream of the delivery chute 5, the sliced products are enclosed or wrapped in a transparent sheet, which is fed off a roll 15. The above-mentioned wrapping material (which may possibly take the form of a bag) is closed and sealed by a cutting-and-sealing unit 16, for example of the rotating-jaw type, associated to which there is a labelling machine (not explicitly illustrated but of a known type). The latter machine affixes a label indicating the characteristics (type, quantity, price, etc.) of the purchased product on the package thus formed, which is then to be picked up by the user by opening the drawer constituting the delivery chute 5.

The packages may possibly be vacuum-wrapped by providing a corresponding apparatus (of a known type) in the cabinet 2.

It should, on the other hand, be noted that, as mentioned previously, the internal atmosphere of the cabinet 2 is already designed to be in any case controlled, also on account of the possible presence of an inert gas. This enables packaging directly in a controlled atmosphere.

If so desired, the unit for dispensing the trays, which is designed to feed the conveyor 12, may be replaced by, or be associated to, a device for dispensing slices of bread. In this case, the device according to the invention may be configured as an automatic dispensing device for sandwiches prepared on the spot. This also applies to possible heating (for example by means of an infrared source) and/or application of creams or fillings.

As regards the configuration of the control unit 11, it is evident that this can be configured in such a way as to accept any form of payment, whether via money (coins or banknotes) or using magnetic badges (bancomat, credit cards, badges issued by the supermarket, etc.).

Of course, without prejudice to the principle of the invention, the details of construction and the embodiments may vary widely with respect to what is described and illustrated herein, without thereby departing from the scope of the present invention.

What is claimed is:

1. A device for automatically dispensing sliceable foodstuff products, comprising, in combination:

a cabinet with means associated thereto to maintain in the cabinet itself a controlled atmosphere to prevent deterioration of said foodstuff products;

container means for containing said products in said cabinet;

an automatic slicing machine for controlled slicing of said products;

motor means for producing a relative movement of said products, on the one hand, and of said automatic slicing machine, on the other, so as to cut said products into slices; and a delivery unit for delivering the products sliced by said slicing machine outside said cabinet.

2. The device according to claim 1, wherein said cabinet carries, associated to it, a refrigerating machine for refrigerating the inside of said cabinet.

3. The device according to claim 1 wherein, said cabinet carries, associated to it, an inert-gas source for maintaining in the cabinet itself a certain quantity of said inert gas.

4. The device according to claim 1, wherein said delivery unit is at least in part configured as a compensation drawer for maintaining said controlled atmosphere in said cabinet (2).

5. The device according to claim 1, wherein said container means comprise a plurality of containers for different products.

6. The device according to claim 1 wherein, said container means carry, associated thereto, respective motor means that are able to position selectively at least one of said products in an area corresponding to said slicing machine.

7. The device according to claim 6, wherein said container means are configured as an automatic store with orthogonal-axes manipulator.

8. The device according to claim 6, wherein said container means are configured as an automatic store having a carousel (paternoster) structure.

9. The device according to claim 1, wherein said container means present a part which enables the products contained in said means to be viewed from outside, and wherein said cabinet comprises a transparent window part through which said products can be viewed from outside the cabinet.

10. The device according to claim 1, wherein said container means are configured for receiving inside them foodstuffs having at least one of the following configurations:

an overall cylindrical structure; and a brick-like structure, with parallelogram-like cross section.

11. The device according to claim 1, wherein said slicing machine is adjustable to vary selectively the thickness of the slices.

12. The device according to claim 11, wherein said slice thickness can be selected from among a plurality of different ranges.

13. The device according to claim 11 wherein, said slice thickness can be selected within three thickness ranges, namely, thin, medium, and thick.

14. The device according to claim 1, wherein said slicing machine is selectively controllable according to a given number of slices of product to be cut.

15. The device according to claim 1, wherein said slicing machine carries, associated to it, a weighing machine, and said slicing machine is selectively controllable for cutting a given number of slices of product determined according to the weight read by said weighing machine.

16. The device according to claim 1, wherein the relative movement of said container means and said slicing machine for slicing said products is obtained by keeping said slicing machine fixed and moving said container means.

17. The device according to claim 1, wherein the relative movement of said container means and said slicing machine for slicing said products is obtained by moving said slicing machine and keeping said container means fixed.

18. The device according to claim 1, wherein said slicing machine carries, associated to it, a collection element for collecting any scraps resulting from the slicing operation.

19. The device according to claim 18, wherein said scrap-collection element is mounted in said cabinet, for example in a drawer-like configuration, which enables easy removal of said scraps from said cabinet.

20. The device according to claim 1, wherein associated to said slicing machine is a unit for dispensing trays for collection of said sliced products from said slicing machine.

21. The device according to claim 1, wherein associated to said slicing machine is a unit for dispensing slices of bread for preparing sandwiches starting from said sliced products.

22. The device according to claim 1, wherein associated to said slicing machine is a unit for supplying wrapping material for wrapping the sliced products and/or the trays or sandwiches containing said sliced products.

23. The device according to claim 22, wherein said wrapping unit is configured for providing vacuum-packaging.

24. The device according to claim 1, wherein associated to said slicing machine is a labelling unit for application of labels on the packages of the products dispensed.

25. The device according to claim 1, comprising a control unit for selective control of the dispensing of said products.

26. The device according to claim 25, whrein said control unit is configured for accepting different types of payment means, such as money and/or badges.

* * * * *